Jan. 21, 1964 W. E. WOHLENBERG ETAL 3,119,067

PHASE SHIFT COMPENSATOR

Filed Oct. 2, 1961

August W. Rihaczek
William E. Wohlenberg,
*INVENTORS.*

*BY* S. J. Rotondi
A. P. Dupont
D. H. Ward

United States Patent Office 3,119,067
Patented Jan. 21, 1964

3,119,067

PHASE SHIFT COMPENSATOR

William E. Wohlenberg, 1929 Klein Ave., Las Cruces, N. Mex., and August W. Rihaczek, 2502 Ridgeland, Torrance, Calif.

Filed Oct. 2, 1961, Ser. No. 179,823
6 Claims. (Cl. 325—477)
(Granted under Title 35, U.S. Code (1952), sec. 266)

The invention described herein may be manufactured and used by or for the Government for governmental purposes without the payment of any royalty thereon.

This invention relates generally to a means for correcting an undesirable phase shift in conventional circuitry and more particularly to a means used in selective filters for eliminating phase variation of an output signal with changing frequency.

In communication equipment much attention has been paid to the design of narrow-band amplifiers with constant phase of the output signal with changing frequency. A reduction of the phase shift through increasing the bandwidth of the filter leads to bandwidths which are prohibitively large for proper suppression of noise and interference. The common method of increasing the coupling of doubletuned circuits also leads to excessive increase in the bandwidth, if a worthwhile reduction of the phase variation is to be achieved. As can be understood from circuit theory, all such methods have failed to achieve the goal of narrow-band filters without frequency dependence of the phase of the transfer impedance.

It is well known that the frequency dependence of the phase in selective circuits causes problems in systems that utilize the signal phase as a carrier of information. In designing highly selective circuits, difficulty is encountered in achieving a narrow-band characteristic without, simultaneously, introducing a strong frequency dependence of the phase. This sensitivity of the phase to frequency changes, greater in filters of higher selectivity, will be of no interest in a system utilizing solely the amplitude of the signal as a carrier of information. If, however, the phase of the signal conveys a part or all of the information, any variation in phase may greatly restrict the system capabilities. For example, in Doppler instrumentation for missile and satellite trajectory measurements, a phase shift originating within the equipment, rather than as a result of movement of the object being tracked, will introduce an error in measurement. Because of the increasing importance of Doppler systems, extensive work has gone into the development of selective, constant-phase transponders and receivers. Heretofore, the only successful approach to this problem has been the phase-lock system or tracking filter, which uses a feedback-loop to tie the phase of the output signal to that of the input signal. In addition to providing the desired constancy of phase over its narrow pass band, a tracking filter can follow a signal of changing frequency within a wide frequency band. This is more than is needed for many practical applications where a constant phase is of paramount importance rather than the extremely narrow bandwidth which can be realized with a tracking filter. Although this method has been successful for some applications, several disadvantages prohibit its utilization in many important applications. As a main disadvantage, tracking filters are very complex in design and hence expensive, bulky, and susceptible to failure. This fact excludes tracking filters from applications under severe environmental conditions, for example in airborne missile test equipment. Furthermore, the complexity of the tracking filter severely limits the frequency range within which tracking filters can be made to perform satisfactorily. In addition, tracking filters often show unstable operation, hunting effects and appreciable residual variation in the phase of the output signal. Hence, the tracking filter solves some of the problems, but fails in many applications.

Another approach to the solution of a narrow-band, constant-phase filter has been through the application of linear filtering techniques. Such techniques do not permit the design of a highly selective filter without simultaneously obtaining, within the pass band, a strong dependence of the phase on the signal frequency. This is true for all types of passive and active linear networks. For a minimum phase shift, network theory shows that phase and attenuation characteristics are uniquely related to each other. Unfortunately, the slope of the phase characteristic increases with decreasing bandwidth so that the variation of the phase cannot be suppressed without destroying the selective properties of the filter. Furthermore, because of the unique relation between phase and attenuation, it is impossible to design two selective filters with phase variations in the opposite direction and compensate the over-all phase variation by using the filters in series. These results are still valid when all-pass filters are included, for the phase characteristic of an all-pass filter is of the same type as that of a band-pass filter within its pass band. Finally, these conclusions must hold even when active elements are incorporated, since active elements can only add positive or negative attenuation.

It is, therefore, one object of this invention to provide a phase shift compensating circuit which eliminates the phase shift of the output signal with changing frequency through the use of nonlinear circuit techniques.

It is another object of this invention to achieve compensation of the phase variation in the output signal by reversing the trend of the phase variation through the reversal of the frequency variation.

A further object of this invention is to provide a means for eliminating the effects associated with the unavoidable phase shift of selective filters.

It is still a further object to provide a reliable, yet simple circuit of high selectivity having a fixed center frequency with a bandwidth just wide enough to accommodate the expected frequency shift of the signal and a phase shift which is independent of the frequency.

In accordance with the present invention, the foregoing and other related objects are attained by providing a circuit wherein the signal frequency is inverted by means of a first mixer and then passed through a filter to create a phase shift in one direction. The signal frequency is then reinverted in another mixer, and the resulting signal is again passed through a filter which now effects a phase change in the opposite direction. By properly choosing the filter constants and combining the two signals, the two phase shifts will compensate each other, giving an output signal whose phase is independent of the frequency.

The novel features of the present invention will be understood from the following detailed description when considered in connection with the accompanying drawing in which similar reference characters represent similar parts, and in which.

Figure 1:
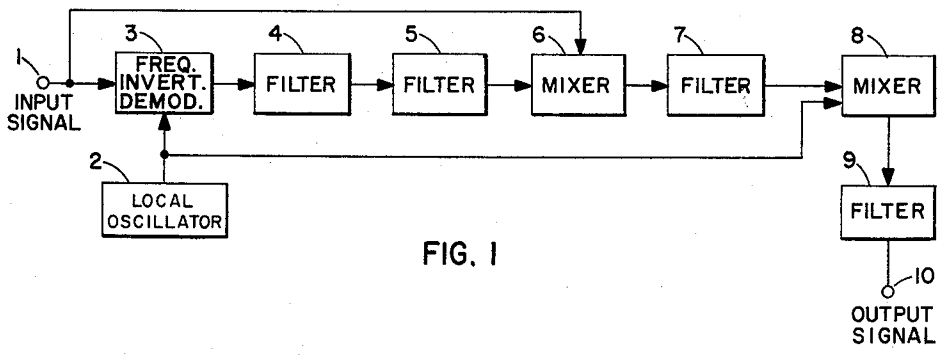
FIGURE 1 shows a block diagram of a preferred form of the invention.

As shown by FIGURE 1 an input signal frequency from terminal 1 and a reference signal of higher frequency from local oscillator 2 are fed to a frequency inverting demodulator 3 which may be a conventional mixing tube. Mixer 3 as well as mixers 6 and 8 do not necessarily contain a mixing tube since this mixing function can be accomplished by any tube, transistor, crystal or any other suitable non-linear device. In mixer 3 the signal frequency is subtracted from the higher reference frequency to yield an output frequency signal which will be inverted with respect to the input signal frequency from terminal 1. Thus, a reversal of the frequency change is accomplished which is necessary in order to generate an opposite phase change with changing input frequency.

The output signal of mixer 3 is then fed to a filter 4. This filter, which is tuned to the difference frequency between the input signal and the reference frequency signal eliminates the unwanted products of the mixing process and creates a phase shift in one direction. Filter 4 as well as filters 5, 7 and 9, preferably consists of a single tuned parallel circuit. However, these filters may be of any kind suitable for the purpose of the equipment. For example, with narrow-band amplification, usually tuned resonant circuits, either single, multiple coupled or stagger tuned circuits are used. The output signal from filter 4 is fed to another filter 5 which acts as a separate, decoupled stage. Filter 5 is included merely to allow perfect cancellation of the phase shift over the entire pass band. The output of filter 5 is fed to another mixer 6. In mixer 6 the input signal frequency is mixed with the output signal from filter 5 in order that the local oscillator frequency may be again subtracted from the signal in a later mixer stage 8 without reversal of the phase change through the mixing process. Such a reversal of the phase change in the mixer 6 does not take place if the input signal frequency to this mixer is higher than the local oscillator frequency. Now, through the action of filter 7, a phase shift is created in the opposite direction to that of filter 4. In mixer 8 the reference frequency from local oscillator 2 is subtracted to give the original input signal frequency. The final filter 9 selects the desired output signal from mixer 8 and introduces a phase shift in the same direction as filter 7. For proper compensation of the total phase shift the magnitude of the phase shift of filters 4 and 5 must equal the magnitude of the combined phase shift of filters 7 and 9.

A detailed description of the compensation circuit shown in FIGURE 1 will now be given through the use of equations which describe the operations needed to invert the signal frequency and, after filtering, restore the original frequency. These equations may be interpreted in terms of circuitry if it is assumed that (1) each addition or subtraction corresponds to the use of non-linear element for mixing, and (2) an equal signal in any equation means the selection of one particular frequency after the mixer and hence requires a filter.

If brackets are used to indicate terms that represent a single frequency, then $[f_s]$ and $[f_1]$ may be used to designate the signal frequency and the reference frequency respectively. Initially, the signal frequency must be inverted by generating the lower sideband $[f_1-f_s]$ in mixer 3 and and filtering it out through filter 4. The filter also introduces the unavoidable dependence of the phase of the lower sideband on its exact frequency, considering frequency variations within the pass band of the filter, and a phase shift in one direction results. To achieve the reversal of the frequency trend after one type of phase shift has been introduced, mixer 6 transformers the (inverted) lower sideband $[f_1-f_s]$ into the upper sideband $[f_1-f_s]$ by simply adding the signal frequency to the lower sideband to produce a second order mixing product $[f_1-f_s]+2f_s$. Filter 7 selects the (noninverted) upper sideband from mixer 6 which introduces a phase shift having the opposite sign compared to the phase shift of filter 4. Mixer 8 then converts the upper sideband into the original signal frequency by subtracting the reference frequency from the upper sideband $[f_1+f_s]$. Filter 9 selects the desired output signal at terminal 10 and introduces a phase shift of the same sign as preceding filter 7.

This described procedure may be summarized by the following three steps shown by Equation 1:

$$\begin{aligned} &(a)\ [f_1]-[f_s]=[f_1-f_s] \\ &(b)\ [f_1-f_s]+[2f_s]=[f_1+f_s] \\ &(c)\ [f_1+f_s]-[f_1]=[f_s] \end{aligned} \qquad (1)$$

These steps taken in conjunction with FIGURE 1 indicate that the input signal is mixed with a local oscillator signal and the lower sideband if filtered out by filter 4. By means of mixer 6 the lower sideband is mixed with the input signal and then filter 7 selects the second order mixing product $[f_1-f_s]+[2f_s]$ to obtain the upper sideband $[f_1+f_s]$. Finally, the upper sideband is combined with the local oscillator signal in mixer 8, and the original frequency is selected by a filter 9.

Figure 2:
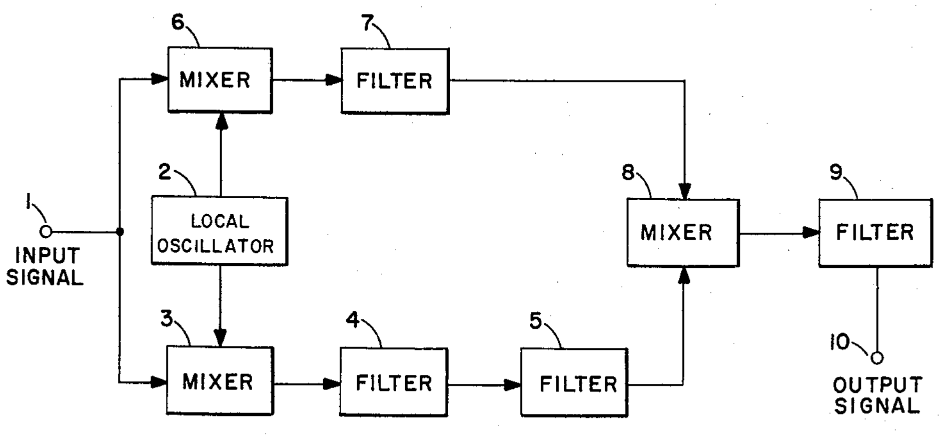
FIGURE 2 shows a block diagram of an alternative form of the invention.

In accordance with the above explanation, a change in the input frequency $[f_s]$, which effects a phase shift in each of the selective filters of FIGURE 1, will not change the phase of the output signal if the magnitudes of the phase shift in filters 4 and 5 equals the sum of the phase shifts of filters 7 and 9. However, even the phase characteristic of the simplest type of filter is too complicated to achieve equality of one phase function to the sum of two such functions over the entire bandwidth of the circuit. For this reason, the filter following mixer 3 has been split into two decoupled parts (filters 4 and 5) permitting perfect cancellation of the phase variations over the entire pass band. An alternate form of the phase compensation circuit is shown in FIGURE 2 wherein the filters are more nearly at the same frequency level.

With the circuit configuration shown in FIGURE 1, the filtering with the "negative" phase shift is done at the lower sideband frequency $[f_1-f_s]$, while the compensating phase shifts of opposite direction is created through filtering at the higher sideband frequency $[f_1+f_s]$ and at the signal frequency $[f_s]$. For some applications, it may be inconvenient to operate at these three appreciably different frequency levels. The phase compensation principle of this invention is general enough to permit variations of the preferred embodiment shown by FIGURE 1. For example, if filtering at approximately the same frequency level is desired, the steps of Equation 1 may be rearranged as follows:

$$\begin{aligned} &[f_1]-[f_s]=[f_1-f_s] \\ &[2f_s]-[f_1]=[2f_s-f_1] \\ &[f_1-f_s]+[2f_s-f_1]=[f_s] \end{aligned} \qquad (2)$$

The last two steps of Equation 2 indicate indicate a different sequence of operations as compared to Equation 1. This different sequence of operations is shown by an alternative form of this invention which is illustrated in FIGURE 2.

FIGURE 2 differs from FIGURE 1 only in the particular arrangement of the different stages. Local oscillator 2 now feeds a reference signal to mixer 6 instead of mixer 8. With reference to Equation 2 the reference frequency from local oscillator 2 is chosen about one and a half times the signal frequency which value would not make selection of the desired mixing product difficult. Filter 5 is again included merely to allow perfect cancellation of the phase shift over the entire band pass. The remainder of the circuit in FIGURE 2 operates in the same manner as described in FIGURE 1.

Figure 3:
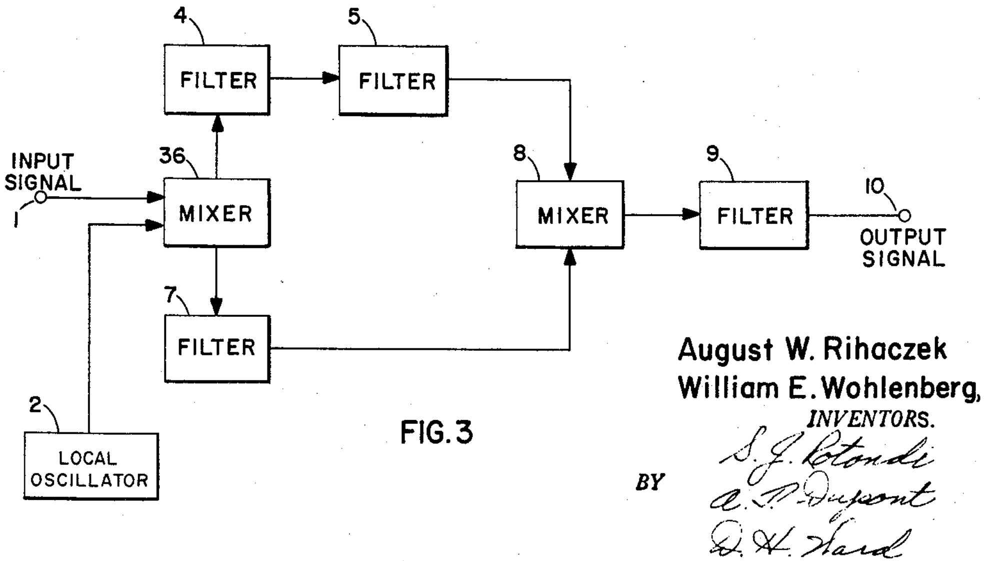
FIGURE 3 shows a block diagram of a more simplified form of the invention.

FIGURE 3 combines the functions of mixer 3 and 6 in one stage as shown by mixer 36. Thus, since mixing the signal frequency with the local oscillator frequency will result in the end products $[f_1-f_s]$ and $[2f_s-f_1]$ one of the mixers 3 and 7 of FIGURE 2 can be eliminated to permit simplification of the circuit as shown in FIGURE 3.

The principle of compensation was developed for systems that involve signals of slow and narrow-band changes of the signal frequency; however, the principle should apply equally well to systems with rapidly changing frequency of the signal, or frequency and phase modulations systems.

Various changes and modifications may be made without departing from the spirit and scope of the invention and it is intended that such obvious changes and modifications be embraced by the annexed claims.

We claim:

1. A phase shift compensating system for narrow-band highly selective circuits comprising a source for providing an input frequency, a second source for providing a reference frequency, means combining said frequencies to provide a first signal output from said means having a frequency change in one direction and a second signal output from said means having a frequency change in a second direction, a pair of filters connected to said combining means, one of said filters responsive to the frequency change in said one direction to provide an output signal from said one filter having a phase shift in one direction, the other of said filters responsive to said frequency change in said second direction to provide an output signal from said other filter having a phase shift in a second direction, and second means combining said phase shifted signals to provide an output signal from said second means having a negligible variation of the phase shift with change in frequency.

2. A phase shift compensating system for narrow-band highly selective circuits comprising a source for providing an input frequency, a second source for providing a higher reference frequency, a mixer for combining said frequencies so that said input frequency is subtracted from said reference frequency to provide an output signal inverted with respect to said input frequency, the output of said mixer connected to a first filter, a second filter connected in series with said first filter, each of the outputs of said filters introducing a phase shift in the same direction, a second mixer for combining the output of said second filter with the input frequency to provide a non-inverted output signal, a third filter connected to the output of the second mixer to provide a phase shift in the opposite direction to said first and second filters, a third mixer connected to the output of said third filter and said second source for subtracting the reference frequency from the output of said third filter to provide a frequency equal to the original input frequency, and a fourth filter connected to the output of the third mixer to provide a phase shift in the same direction as the third filter, the magnitude of the combined phase shift of said first and second filters being equal to the magnitude of the combined phase shift of said third and fourth filters to provide cancellation of the over-all phase variation.

3. A system according to claim 2 wherein said first mixer is a frequency inverting demodulator.

4. A system according to claim 2 wherein said referenced frequency is provided by a local oscillator.

5. A phase shift compensating device for narrow-band highly selective circuits, comprising a source for providing an input frequency, a second source for providing a reference frequency, a first mixer for combining said frequencies so that said input frequency is subtracted from said reference frequency to provide an output signal inverted with respect to said input frequency, a first filter connected to said first mixer for receiving said output signal, a second filter connected in series with said first filter, each of the outputs of said filters introducing a phase shift in the same direction, a second mixer connected to said second filter and to said input source for combining said input and said output signals to provide a non-inverted signal, a third filter connected to the output of said second mixer to provide a phase shift in the opposite direction to said first and second filters, a third mixer wherein the outputs of said second source and said third filters are combined to provide a frequency equal to the original input frequency and a fourth filter connected to the output of said third mixer to provide a phase shift in the same direction as the third filter, the magnitude of the combined phase shift of said first and second filters being equal to the magnitude of the combined phase shift of said third and fourth filters to provide cancellation of the over-all phase variation.

6. A system according to claim 5 wherein said reference frequency is one and a half times greater than the input frequency.

References Cited in the file of this patent

UNITED STATES PATENTS 3,019,296 Schelleng ---------------- Jan. 30, 1962